April 21, 1959  W. A. REICH  2,882,833
APPARATUS FOR LOWERING ANIMAL CARCASSES FROM OVERHEAD TRACKS
Filed July 9, 1956  2 Sheets-Sheet 1

INVENTOR.
Walter A. Reich
BY
ATTORNEY.

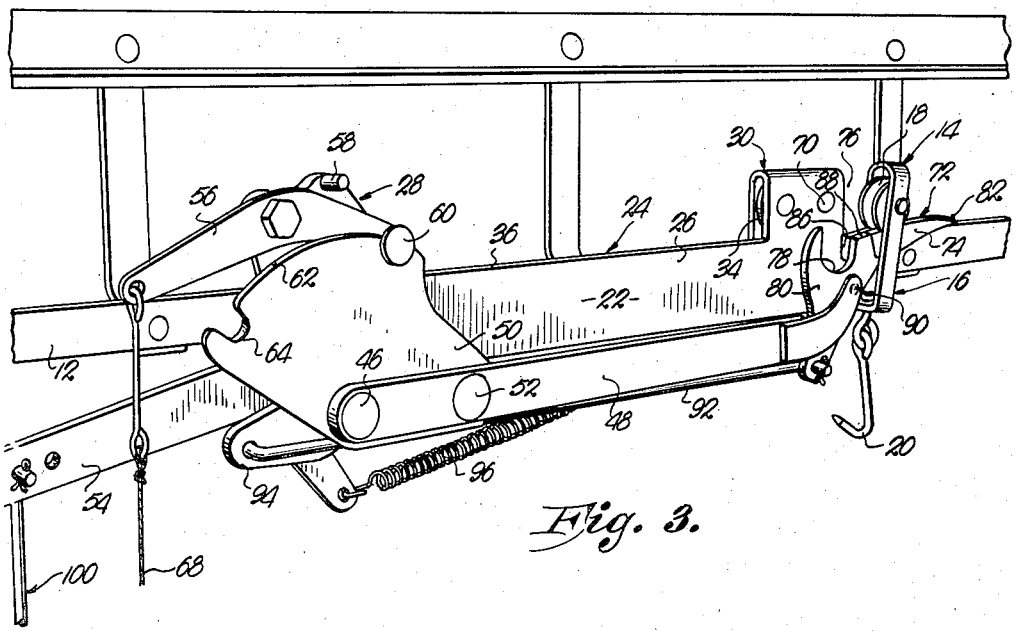
Fig. 3.
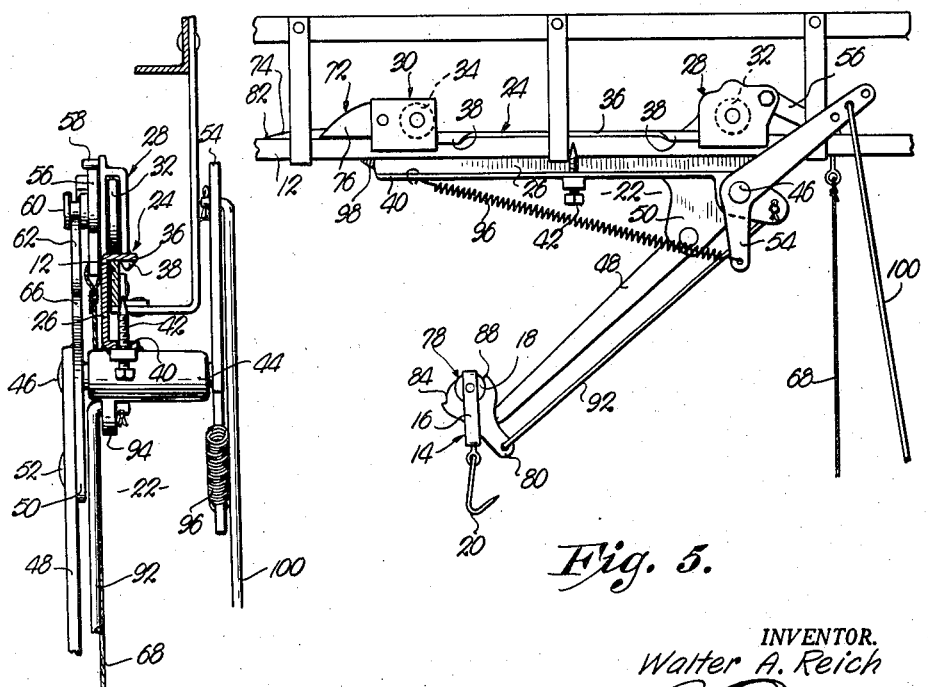
Fig. 4.
Fig. 5.
INVENTOR.
Walter A. Reich
BY
ATTORNEY.

United States Patent Office 2,882,833
Patented Apr. 21, 1959

2,882,833

APPARATUS FOR LOWERING ANIMAL CARCASSES FROM OVERHEAD TRACKS

Walter A. Reich, Kansas City, Mo., assignor to A. Reich & Sons, Inc., Kansas City, Mo., a corporation of Missouri Application July 9, 1956, Serial No. 596,504

12 Claims. (Cl. 104—89)

This invention relates to slaughterhouse equipment and particularly to apparatus for facilitating the handling of animal carcasses, the primary object being to provide means for lowering the carcass with respect to an overhead track from which the same is suspended, whereby to facilitate subseequent handling of the carcass.

It is the most important object of the present invention to provide apparatus of the aforementioned character that is operable not only to lower the carcass, but to position the same conveniently for severance while in a substantially horizontal position.

A further object of the instant invention is the provision in apparatus as above described of manually operable locking means for holding the swingable structure at either end of its path of travel, to the end that the carcass swings downwardly upon release of the lock means but is normally disposed in a position for receiving a trolley utilized to suspend the carcass from the overhead track.

A still further object of the present invention is to provide yieldable means for automatically returning the swingable arm or structure to an operable position after removal of the carcass therefrom and release of the lock means just above mentioned.

It is another important object of this invention to provide a swingable member having a saddle for receiving the trolley wheel swingably mounted on the aforementioned arm and provided with parallel motion mechanism for maintaining the saddle upwardly disposed throughout the swinging path of travel of the arm.

Still another important object of the instant invention is to provide a support in the nature of a carrier for mounting all of the operative parts of the apparatus, the carrier being supported by the track through the medium of rollers and releasably held in place through use of a clamping screw or the like.

Other objects include the way in which a notched plate provided with a cam edge forms a part of the releasable lock means for automatic operation as the swingable structure moves to each end of its path of travel; the way in which a combined deflector and branch rail are swingably mounted on the carrier and yieldably biased against the track to assure derailment of the trolley and guidance into the saddle of the swingable member on the primary arm; and many important details of construction to be made clear as the following specification progresses.

In the drawing:

Fig. 3 is an enlarged perspective view of the apparatus in the normal trolley-receiving position;

Fig. 4 is an enlarged, fragmentary, cross-sectional view taken on line IV—IV of Fig. 2; and Fig. 5 is an elevational view showing that side of the apparatus opposite to Fig. 2.

Figure 1:
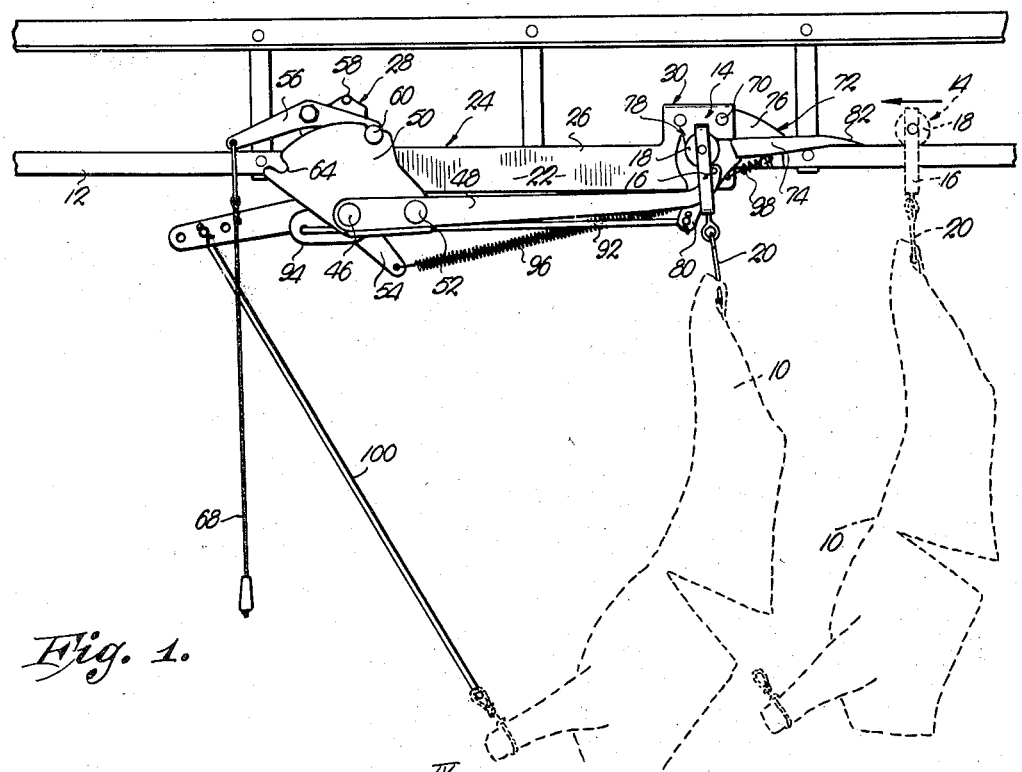
Figure 1 is a side elevational view of apparatus for lowering animal carcasses from overhead tracks showing an animal carcass supported thereby and ready for lowering.
Figure 2:
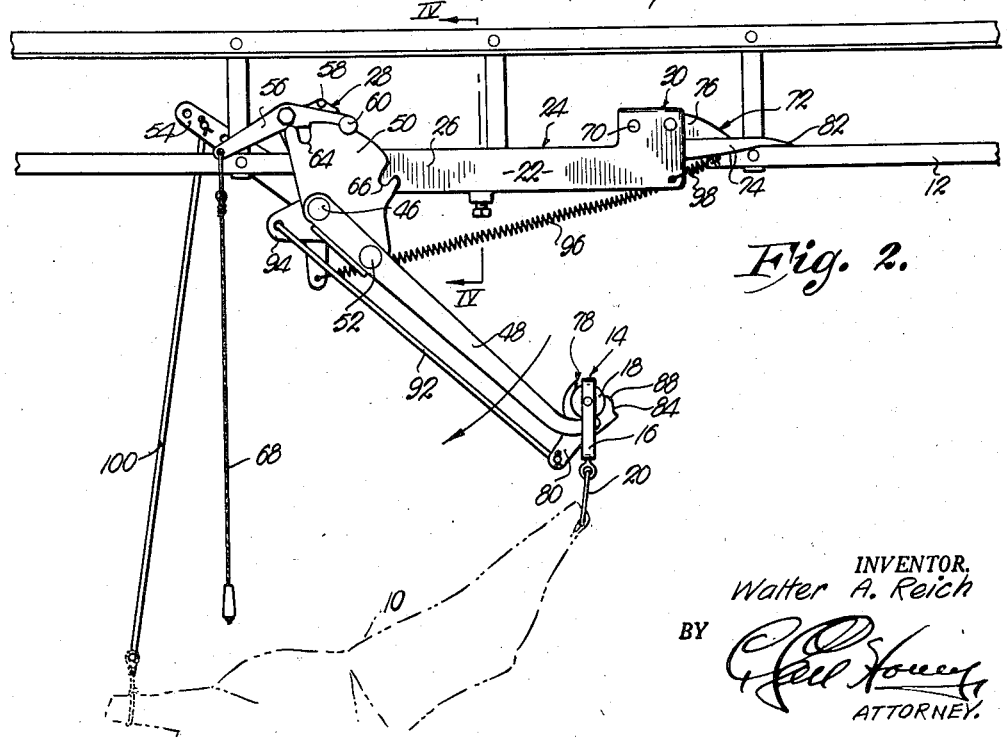
Fig. 2 is a view similar to Fig. 1, illustrating the carcass in a partially lowered condition.

Animal carcasses 10 are conventionally supported and conveyed in slaughterhouses through the medium of an overhead track 12 and particularly by trolleys 14, much in the nature of those illustrated in Figs. 1 to 3 inclusive of the drawing. The trolleys 14 chosen for illustration include a substantially J-shaped bracket 16 supporting a trolley wheel 18 and a hook 20 for receiving the carcasses 10, it being understood that the trolley wheels 18 roll freely along the uppermost horizontal edge of the track 12.

The apparatus forming the subject matter of the instant invention is in the nature of an attachment which may be removably mounted on the track 12, such apparatus being broadly designated by the numeral 22.

Apparatus 22 includes a support in the nature of a carrier 24, consisting of an elongated bar 26 which is U-shaped to present a pair of upstanding ears 28 and 30. Ears 28 and 30 are in turn rebent upon themselves as best seen in Figs. 3 and 4, to receive rollers 32 and 34 respectively disposed to ride along the upper edge of track 12. The uppermost edge of the bar 26 is provided with a laterally extending horizontal flange 36 between the ears 28 and 30 which overlies the track 12 as seen in Figs. 4 and 5, flange 36 in turn being provided with downturned lips 38 that partially overlap that face of the track 12 opposite to bar 26. A laterally extending, horizontally disposed, longitudinal flange 40 at the lowermost edge of the bar 26 underlies the track 12 as seen in Figs. 4 and 5, and carries a locking screw or the like 42 which bears against the track 12 and releasably holds the bar 26 clamped to the track 12.

It is seen that by loosening the screw 42 the entire apparatus 22 may be shifted along the track 12 as the rollers 32 and 34 of carrier 24 rotate along the uppermost edge of track 12. Still further, the entire apparatus 22 may be removed from the track 12 by sufficient loosening of the screw 42 and raising the carrier 24 until the downturned lips 38—38 clear the track 12.

A tubular bearing 44 rigid to the flange 40 thereabove and disposed immediately below the ear 28 rotatably receives a stub shaft 46 to which is rigidly attached swingable structure in the nature of an elongated arm 48, as well as a plate 50 that is in turn connected to the arm 48 through the medium of a suitable fastener 52. A substantially L-shaped device in the nature of a crank 54 is rigidly attached to the opposite end of the stub shaft 46.

In addition to the plate 50 the releasable lock means for holding the arm 48 at either end of its path of travel includes a latch 56 swingably carried by the ear 28 and weight biased away from a stop pin 58 on the ear 28 which limits the extent of swinging movement of latch 56 in one direction. A laterally extending lug 60 on one end of the latch 56 is adapted to ride along uppermost convex cam edge 62 of plate 50 and enter either of a pair of notches 64 and 66 formed in the plate 50. Latch 56 is released manually upon pulling of a cord or the like 68 attached to the opposite end of the latch 56.

Through the medium of a pivot pin 70 the ear 30 of carrier 24 swingably mounts a combined deflector and trolley-receiving rail broadly designated by the numeral 72. It includes a relatively short branch rail 74 and a deflector 76, the latter of which receives the pivot pin 70 and has the rail 74 attached thereto in angular relationship to the track 12 so that trolley 14 is guided from the track 12 into an upwardly facing saddle 78 forming a part of a swingable member 80 carried by the outermost end of the arm 48. One end of the rail means 74 is provided with a slightly convex ramp 82 for receiving trolley wheel 18 and the opposite end of the branch rail 74 is spaced slightly from the proximal face of bar 22, providing sufficient clearance for the trolley 14 to move into the upwardly facing saddle 78 of member 80. A seat 84 is provided in the member 80 which mates with the proximal outermost end of the rail 74 and a spacer 86 on the bar 22 prevents inward movement of the member 80 so that uppermost edge 88 of the latter is flush with the uppermost edge of the branch rail 74 when the member 80 is positioned as shown in Figs. 1 and 3 of the drawings.

Parallel motion mechanism is provided to maintain the saddle 78 in an upwardly facing position throughout swinging movement of the arm and to this end, arm 48 is bifurcated to receive the member 80 and swingably mount the same through pivot pin 90. An elongated link 92 pivotally interconnects the member 80 and a lateral extension 94 rigid to the bearing 44.

A spring 96 connected with the flange 40 beneath ear 30 joins with one end of the crank 54 to yieldably bias the arm 48 to the position illustrated in Figs. 1 and 3 of the drawing. The deflector 76 partially overlaps the track 12 as seen in Fig. 1, and a short spring 98 connecting deflector 76 with the proximal end of the bar 26 biases the ramp end 82 of the short rail 74 against the upper edge of track 12.

When the trolley 14 is seated within the saddle 78 as seen in Fig. 1, the lowermost end of carcass 10 is connected with crank 54 through the medium of an elongated rod 100 adjustably and pivotally coupled with that end of crank 54 opposite to spring 96.

Operation

When the apparatus 22 is mounted on the track 12 and the bar 26 of carrier 24 clamped to the track 12 through use of the lock screw 42, the ramp end 82 of rail 74 is held tightly against the upper edge of rail 12 by spring 98.

This places the rail 74 in position for receiving the trolleys 14, each of which suspends a carcass 10 from the rail 12 through the medium of hook 20. As the trolleys 14 roll along the track 12 and onto the ramp 82, the trolley wheels 18 will roll along the uppermost edge of rail 74 and by cooperation of the deflector 76, will be guided to a position where the wheel 18 rolls into the saddle 78 of member 80.

Carcass 10 is then supported by the apparatus 22 as seen in Fig. 1 because of the fact that the arm 48 is held against downward swinging movement until latch 56 is released. It is seen in Figs. 1 and 3 that the lug 60 is seated within the notch 66 of plate 50, thereby preventing downward swinging movement of the arm 48, plate 50 and crank 54.

As soon as one of the trolleys 14 and the carcass 10 supported thereby has been moved into position supported by the member 80, the operator attaches the lowermost end of the carcass 10 to the crank 54 by fastening the lowermost end of rod 100 to carcass 10.

Thereupon, by exerting a downward pull on the cord 68 to swing the latch 56 upwardly against the stop 58, lug 60 is withdrawn from the notch 66 and the arm 48 swings downwardly by virtue of the weight of carcass 10 toward the position illustrated in Fig. 2 of the drawing.

Since the crank 54 is rigid to the stub shaft 46, it swings upwardly as a unit with the plate 50 and the arm 48 as the latter swings downwardly. This action imparts a pull to the lowermost end of the carcass 10 through the rod 100, thereby swinging the carcass 10 to a substantially horizontal position when the lug 60 moves into the notch 64.

In view of the fact that the latch 56 is counterbalanced to swing clockwise, view Figs. 1, 3 and 5, the lug 60 will ride along the cam edge 62 during downward swinging movement of the arm 48 and automatically move into the notch 64 as soon as the latter becomes aligned therewith.

With the swinging structure of the apparatus 22 thus locked in position with the carcass 10 disposed substantially horizontally, the latter may easily and quickly be severed into two parts, one of which will remain supported by hook 20 and the other of which is held by the rod 100 to which it is attached.

As soon as the two carcass halves are removed the operator need merely exert a pull on the cord 68 to again release the latch 56 and retract the lug 60 from within the notch 64. The spring 96 will thereupon return the arm 48 to the position shown in Figs. 1 and 3 because of the attachment of spring 96 to the crank 54. Again, as the seat 84 of member 80 moves into engagement with the outermost free end of branch rail 74, the lug 60 will automatically move into the notch 66, locking the swinging structure against downward movement as the next succeeding trolley 14 is moved into position within the saddle 78.

It is to be particularly noted that because of the provision of link 92 and the swinging attachment of the member 80 to the outermost free end of arm 48, saddle 78 always remains substantially in an upwardly facing position whereby the trolley wheel 18 will not become displaced from the saddle 78 during downward swinging movement of arm 48.

Having thus described the invention what is claimed as new and desired to be secured by Letters Patent is:

1. Apparatus for lowering an animal carcass suspended from an overhead track through a trolley carried by the track, said apparatus including structure normally disposed in a position for receiving said trolley from the track; means mounting said structure on the track for movement to a lowered position relative to the track; and means connected with said structure and adapted for attachment to the lowermost end of the carcass for raising said end as the structure moves to said lowered position.

2. Apparatus for lowering an animal carcass suspended from an overhead track through a trolley carried by the track, said apparatus including structure normally disposed in a position for receiving said trolley from the track, said structure having a member mounted thereon and provided with an upwardly facing, trolley-receiving saddle; means mounting said structure on the track for movement to a lowered position relative to the track; and mechanism coupled with said member for maintaining the saddle thereof in an upwardly facing position throughout the path of travel of the structure.

3. Apparatus for lowering an animal carcass suspended from an overhead track through a trolley carried by the track, said apparatus including rail means carried by the track and disposed to receive said trolley from the track; structure separate from the rail means and normally disposed in a position for receiving said trolley from the rail means; means mounting said structure on the track for movement to a lowered position relative to the track; and yieldable means coupled with said rail means for holding the latter biased against the track.

4. Apparatus for lowering an animal carcass suspended from an overhead track through a trolley carried by the track, said apparatus including structure normally disposed in a position for receiving said trolley from the track; means mounting said structure on the track for movement to a lowered position relative to the track; means connected with said structure and adapted for attachment to the lowermost end of the carcass for raising said end as the structure moves to said lowered position; and means coupled with said structure for yieldably biasing the same toward said normal position.

5. Apparatus for lowering an animal carcass suspended from an overhead track through a trolley carried by the track, said apparatus including structure normally disposed in a position for receiving said trolley from the track, said structure having a member mounted thereon and provided with an upwardly facing, trolley-receiving saddle; means mounting said structure on the track for movement to a lowered position relative to the track; means connected with said structure and adapted for attachment to the lowermost end of the carcass for raising said end as the structure moves to said lowered position; and mechanism coupled with said member for maintaining the saddle thereof in an upwardly facing position throughout the path of travel of the structure.

6. Apparatus for lowering an animal carcass suspended from an overhead track through a trolley carried by the track, said apparatus including structure normally disposed in a position for receiving said trolley from the track; means mounting said structure on the track for movement to a lowered position relative to the track; releasable means normally engaging said structure for alternately holding the same in either of said positions; means connected with said structure and adapted for attachment to the lowermost end of the carcass for raising said end as the structure moves to said lowered position; and means coupled with said structure for yieldably biasing the same toward said normal position.

7. Apparatus for lowering an animal carcass suspended from an overhead track through a trolley carried by the track, said apparatus including rail means carried by the track and disposed to receive said trolley from the track; structure normally disposed in a position for receiving said trolley from the rail means; means mounting said structure on the track for movement to a lowered position relative to the track; means connected with said structure and adapted for attachment to the lowermost end of the carcass for raising said end as the structure moves to said lowered position; and means coupled with said structure for yieldably biasing the same toward said normal position.

8. Apparatus for lowering an animal carcass suspended from an overhead track through a trolley carried by the track, said apparatus including rail means carried by the track and disposed to receive said trolley from the track; structure normally disposed in a position for receiving said trolley from the rail means; means mounting said structure on the track for movement to a lowered position relative to the track; means connected with said structure and adapted for attachment to the lowermost end of the carcass for raising said end as the structure moves to said lowered position; means coupled with said structure for yieldably biasing the same toward said normal position; and yieldable means coupled with said rail means for holding the latter biased against the track.

9. Apparatus for lowering an animal carcass suspended from an overhead track through a trolley carried by the track, a support adapted for mounting on the track; an arm swingably mounted on the support; means separate from the arm and carried by the track for deflecting the trolley from the track to the arm; and releasable lock means normally engaging the arm for holding the same in position for receiving the trolley from the track, whereby on release of the lock the arm swings downwardly to lower the trolley and the carcass suspended therefrom.

10. Apparatus for lowering an animal carcass suspended from an overhead track through a trolley carried by the track, a support adapted for mounting on the track; an arm swingably mounted on the support; means carried by the track for deflecting the trolley from the track to the arm; releasable lock means normally holding the arm in position for receiving the trolley from the track, whereby on release of the lock the arm swings downwardly to lower the trolley and the carcass suspended therefrom; a device coupled with the arm for upward swinging movement as the arm swings downwardly; and means for connecting the device with the lowermost end of the carcass for swinging said end upwardly as the trolley descends.

11. Apparatus for lowering an animal carcass suspended from an overhead track through a trolley carried by the track, a support adapted for mounting on the track; an arm swingably mounted on the support; means carried by the track for deflecting the trolley from the track to the arm; releasable lock means normally engaging the arm for holding the same in position for receiving the trolley from the track, whereby on release of the lock the arm swings downwardly to lower the trolley and the carcass suspended therefrom; said arm having a member mounted thereon and provided with an upwardly facing, trolley-receiving saddle; and mechanism coupled with said member for maintaining the saddle thereof in an upwardly facing position throughout the path of travel of the arm.

12. Apparatus as set forth in claim 11 wherein said member is swingable on the arm and wherein said mechanism includes a link pivotally interconnecting the member and the support.

References Cited in the file of this patent

UNITED STATES PATENTS

| | | |
|---|---|---|
| 387,907 | Pendleton | Aug. 14, 1888 |
| 1,813,022 | Burner | July 7, 1931 |
| 2,159,623 | Schmidt | May 23, 1939 |
| 2,401,942 | Le Fiell | June 11, 1946 |
| 2,407,620 | Vinsant | Sept. 10, 1946 |
| 2,551,155 | Orling | May 1, 1951 |
| 2,555,072 | Zaemkert | May 29, 1951 |
| 2,730,963 | Garapolo et al. | Jan. 17, 1956 |